(12) United States Patent
Murray et al.

(10) Patent No.: US 9,821,861 B2
(45) Date of Patent: Nov. 21, 2017

(54) VEHICLE

(71) Applicant: YAMAHA HATSUDOKI KABUSHIKI KAISHA, Iwata-shi, Shizuoka (JP)

(72) Inventors: Gordon Murray, Surrey (GB); Frank Coppuck, Surrey (GB); Kevin Richards, Surrey (GB); Andrew Jones, Surrey (GB); Zachary Seward, Surrey (GB); Paul Gabe, Surrey (GB); Masato Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 49 days.

(21) Appl. No.: 15/035,770

(22) PCT Filed: Nov. 12, 2014

(86) PCT No.: PCT/JP2014/079934
§ 371 (c)(1),
(2) Date: May 11, 2016

(87) PCT Pub. No.: WO2015/072476
PCT Pub. Date: May 21, 2015

(65) Prior Publication Data
US 2016/0325790 A1    Nov. 10, 2016

(30) Foreign Application Priority Data

Nov. 13, 2013    (JP) .................................. 2013-234760

(51) Int. Cl.
B62D 35/00    (2006.01)
B62D 25/02    (2006.01)
(Continued)

(52) U.S. Cl.
CPC ............ *B62D 35/00* (2013.01); *B60Q 1/0035* (2013.01); *B60Q 1/0041* (2013.01); *B62D 25/02* (2013.01);
(Continued)

(58) Field of Classification Search
CPC ...... B62D 35/00; B62D 25/105; B62D 25/16; B60Q 1/0017; B60Q 1/0041; B60Q 1/0047
(Continued)

(56) References Cited

U.S. PATENT DOCUMENTS 5,042,870 A * 8/1991 Yura ...................... B60K 11/08
                                                           180/903
5,184,832 A * 2/1993 Miwa ................... B62D 35/005
                                                           280/848
(Continued)

FOREIGN PATENT DOCUMENTS

CN    101643094 A    2/2010
CN    201761555 U    3/2011
(Continued)

OTHER PUBLICATIONS

Official Communication issued in International Patent Application No. PCT/JP2014/079934, dated Jan. 27, 2015.

*Primary Examiner* — Dennis H Pedder
(74) *Attorney, Agent, or Firm* — Keating and Bennett, LLP

(57) ABSTRACT

In a vehicle, a first recess portion extending in a vehicle widthwise direction is located in a boundary portion between a hood portion and a front bumper portion. A second recess portion is located in each of headlight portions. A third recess portion extending in the front-rear direction is located in each of front fender portions. The upper edges of the first, second, and third recess portions (Continued)

define a ridge line which projects toward the outside of the vehicle body and extends from the center in the vehicle widthwise direction to the vehicle body rear side beyond the lower end of a pillar portion through position lamp portions. The ridge line is defined by a first overhang portion of the hood portion, a lamp cover of each of the position lamp portions, and a bulge portion of each of the front fender portions.

7 Claims, 12 Drawing Sheets

(51) Int. Cl.
*B62D 25/10* (2006.01)
*B62D 25/16* (2006.01)
*B60Q 1/00* (2006.01)
*B62D 25/08* (2006.01)

(52) U.S. Cl.
CPC ........... *B62D 25/08* (2013.01); *B62D 25/105* (2013.01); *B62D 25/16* (2013.01)

(58) Field of Classification Search
USPC .................................. 296/180.1, 208, 181.5
See application file for complete search history.

(56) References Cited

U.S. PATENT DOCUMENTS

| | | |
|---|---|---|
| 2010/0026045 A1 | 2/2010 | Thomas |
| 2011/0100743 A1 | 5/2011 | Haunstetter et al. |
| 2012/0104795 A1 | 5/2012 | Komiya et al. |
| 2012/0104800 A1 | 5/2012 | Dimitriou et al. |
| 2013/0093210 A1 | 4/2013 | Johnson |

FOREIGN PATENT DOCUMENTS

| | | |
|---|---|---|
| CN | 102470897 A | 5/2012 |
| CN | 103057604 A | 4/2013 |
| JP | 60-144578 U | 9/1985 |
| JP | 63-048680 U | 4/1988 |
| JP | 2003-034271 A | 2/2003 |
| JP | 2003-276650 A | 10/2003 |
| JP | 2010-158984 A | 7/2010 |
| JP | 2011-042353 A | 3/2011 |
| JP | 2013-129426 A | 7/2013 |
| RU | 2 485 032 C1 | 6/2013 |

* cited by examiner

VEHICLE

BACKGROUND OF THE INVENTION

1. Field of the Invention

The present invention relates to a vehicle including a hood portion and a front bumper portion in front of a windshield.

2. Description of the Related Art

An example of conventional vehicles of this type is described in Japanese Patent Laid-Open No. 2013-129426. This vehicle disclosed in Japanese Patent Laid-Open No. 2013-129426 is a passenger car including a windshield covering the front portion of the vehicle interior, and side windows covering the side portions of the vehicle interior. A hood portion of this vehicle extends forward and downward from the front end of the windshield.

A front bumper portion of this vehicle has a shape which vertically extends in a portion closer to the vehicle body front side than the front end of the hood portion. The two end portions of each of the hood portion and front bumper portion in the vehicle widthwise direction are connected to front fender portions.

When this vehicle disclosed in Japanese Patent Laid-Open No. 2013-129426 is running, the traveling wind flows upward along the surfaces of the hood portion and front fender portions.

The vehicle disclosed in Japanese Patent Laid-Open No. 2013-129426 has the problem that the windshield and the side windows readily become dirty when the vehicle travels in rainy weather. A main substance which makes the windshield and side windows dirty is muddy water splashed by a preceding car or oncoming car.

When splashed by wheels, this muddy water scatters in the form of a mist, and temporarily drifts near the road surface. When a vehicle enters a space in which this mist of muddy water is drifting, the mist of muddy water riding on the traveling wind flows along the body surface of the vehicle, and adheres to the windshield and the side windows. Consequently, the windshield and the side windows become dirty, and this obstructs the view of a passenger.

SUMMARY OF THE INVENTION

Preferred embodiments of the present invention provide a vehicle capable of significantly reducing or preventing a mist of muddy water which is conveyed by wind from adhering to a windshield and side windows.

A vehicle according to a preferred embodiment of the present invention includes a windshield covering a front portion of a vehicle interior, side windows covering side portions of the vehicle interior, a hood portion extending obliquely forward and downward from a front end of the windshield, a front bumper portion positioned below the hood portion when viewed from the front of a vehicle body, front fender portions connected to both ends of each of the hood portion and the front bumper portion in a vehicle widthwise direction, headlight portions positioned in both end portions of a front body in the vehicle widthwise direction, the front body including a combination of the front bumper portion, the front fender portions with the hood portion, turn signal lamp portions or position lamp portions positioned above the headlight portions, and pillar portions vertically extending between the windshield and the side windows, wherein a first recess portion having a shape which opens toward the front of the vehicle body and extends in the vehicle widthwise direction is located at a boundary portion between the hood portion and the front bumper portion, a second recess portion having a shape which opens toward the front of the vehicle body is provided in each of the headlight portions, a third recess portion which opens toward a side of the vehicle body and extends in a front-rear direction of the vehicle body is provided in each of the front fender portions, the first recess portion, the second recess portions, and the third recess portions are aligned in the vehicle widthwise direction and extend in a row, upper edges of the first recess portion, the second recess portions, and the third recess portions define a ridge line which projects toward an outside of the vehicle body and extends from a center in the vehicle widthwise direction to a vehicle body rear side beyond lower ends of the pillar portions through the turn signal lamp portions or the position lamp portions, and the ridge line includes a first overhang portion which projects toward the front of the vehicle body in a boundary portion between the hood portion and the front bumper portion, a second overhang portion which projects toward the front of the vehicle body in the turn signal lamp portion or the position lamp portion, and a bulge portion of the front fender portion, which projects toward the side of the vehicle body.

When the vehicle according to a preferred embodiment of the present invention runs, the traveling wind blows against the front bumper portion. The traveling wind having blown against the front bumper portion and flowed upward along the surface of the front bumper portion changes its flowing direction by blowing against the first or second overhang portion, and is guided into the first and second recess portions. The traveling wind having entered the first and second recess portions flows toward the sides of the vehicle body through these recess portions, and flows to the vehicle body rear side beyond the lower ends of the pillar portions through the third recess portions.

On a rainy day, a running vehicle splashes muddy water on the road surface. This muddy water scatters in the form of a mist and temporarily drifts near the road surface. When the vehicle according to a preferred embodiment of the present invention enters a space in which a mist of muddy water splashed by a preceding car or oncoming car is drifting, the mist of muddy water rides on the traveling wind and flows along the vehicle body surface.

The traveling wind having blown against the front bumper portion flows upward along the front bumper portion. The traveling wind flowing upward along the front bumper portion changes its flowing direction by blowing against the first or second overhang portion, and is guided into the first or second recess portion.

Of the above-described mist of muddy water, a mist of muddy water guided upward together with the traveling wind by the front bumper portion is guided together with the traveling wind into the first or second recess portion. Then, the mist of muddy water flows together with the traveling wind to the two end portions in the vehicle widthwise direction through the recess portion, and flows from the third recess portions to the vehicle body rear side beyond the lower ends of the pillar portions.

Accordingly, various preferred embodiments of the present invention provide vehicles that significantly reduce or prevent a mist of muddy water riding on the traveling wind from adhering to the windshield and the side windows.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Vehicles according to preferred embodiments of the present invention will be explained in detail below with reference to FIGS. 1 to 11.

Figure 1:
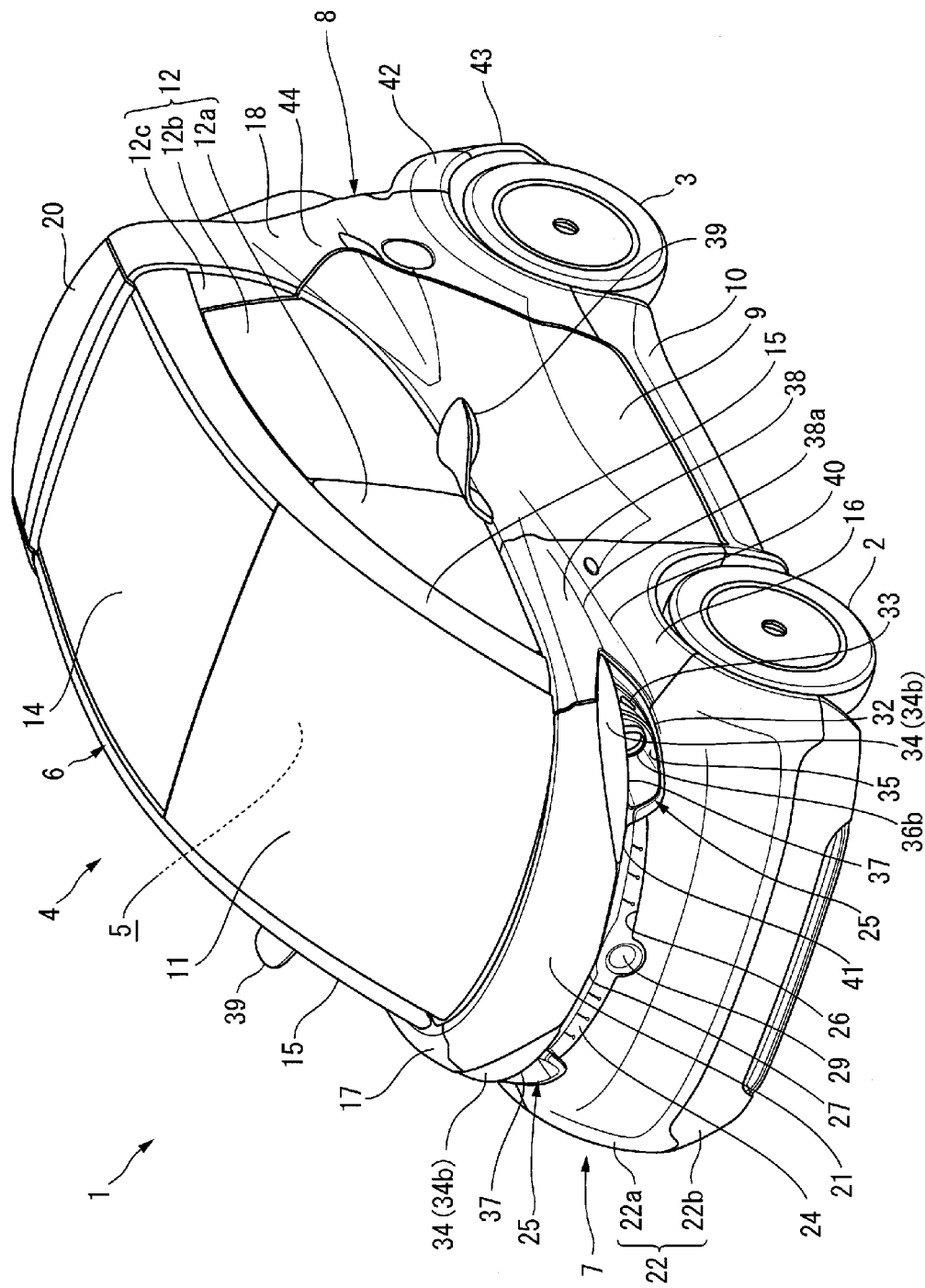
FIG. 1 is a perspective view of a vehicle according to a first preferred embodiment of the present invention.

A vehicle 1 shown in FIG. 1 is a passenger car capable of accommodating two passengers (not shown), and includes a chassis (not shown) including front wheels 2 and rear wheels 3, and a body 4 as an exterior portion of this vehicle. In this preferred embodiment, the chassis and body 4 define "a vehicle body".

Figure 2:
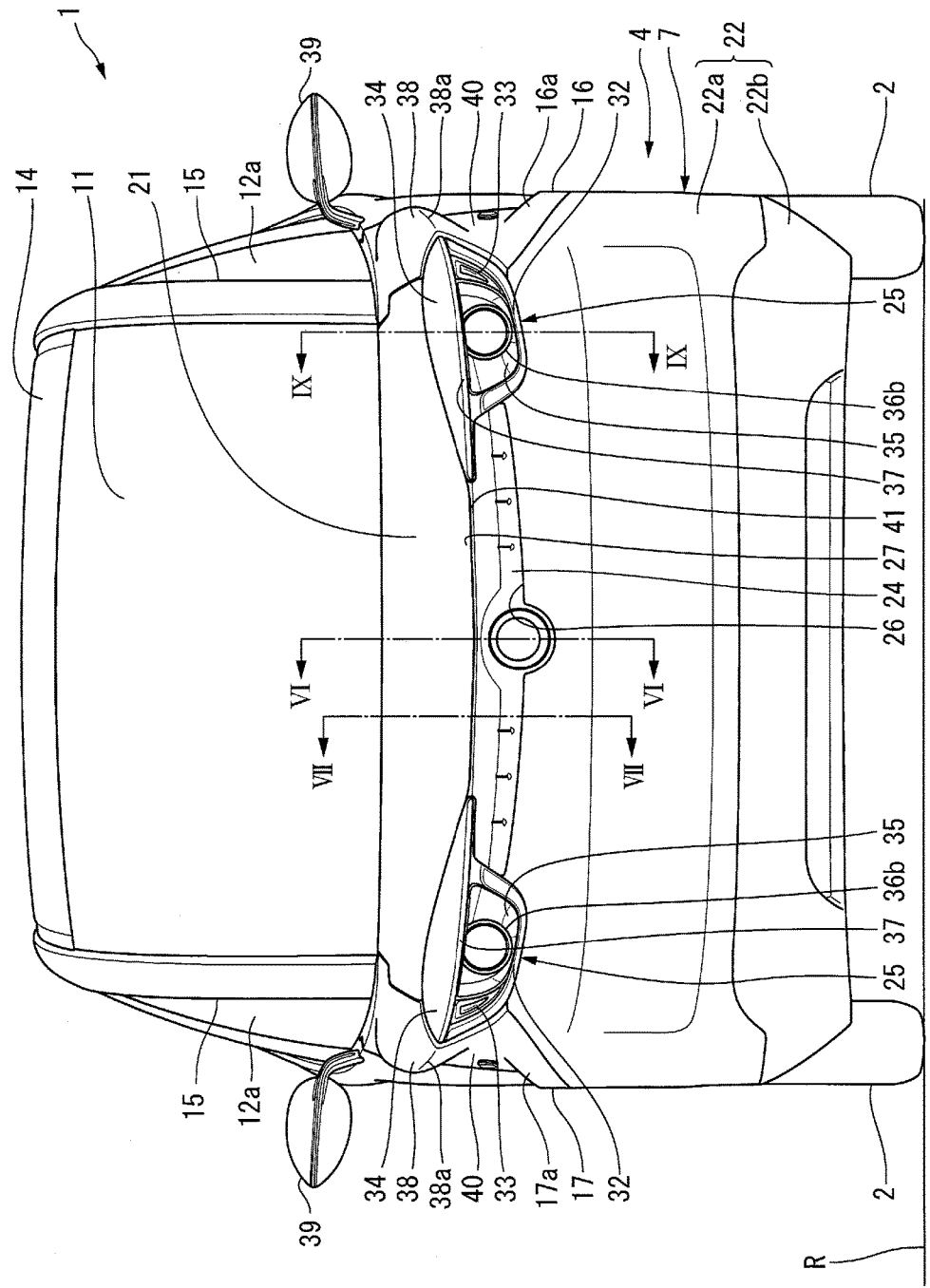
FIG. 2 is a front view of the vehicle according to the first preferred embodiment of the present invention.
Figure 3:
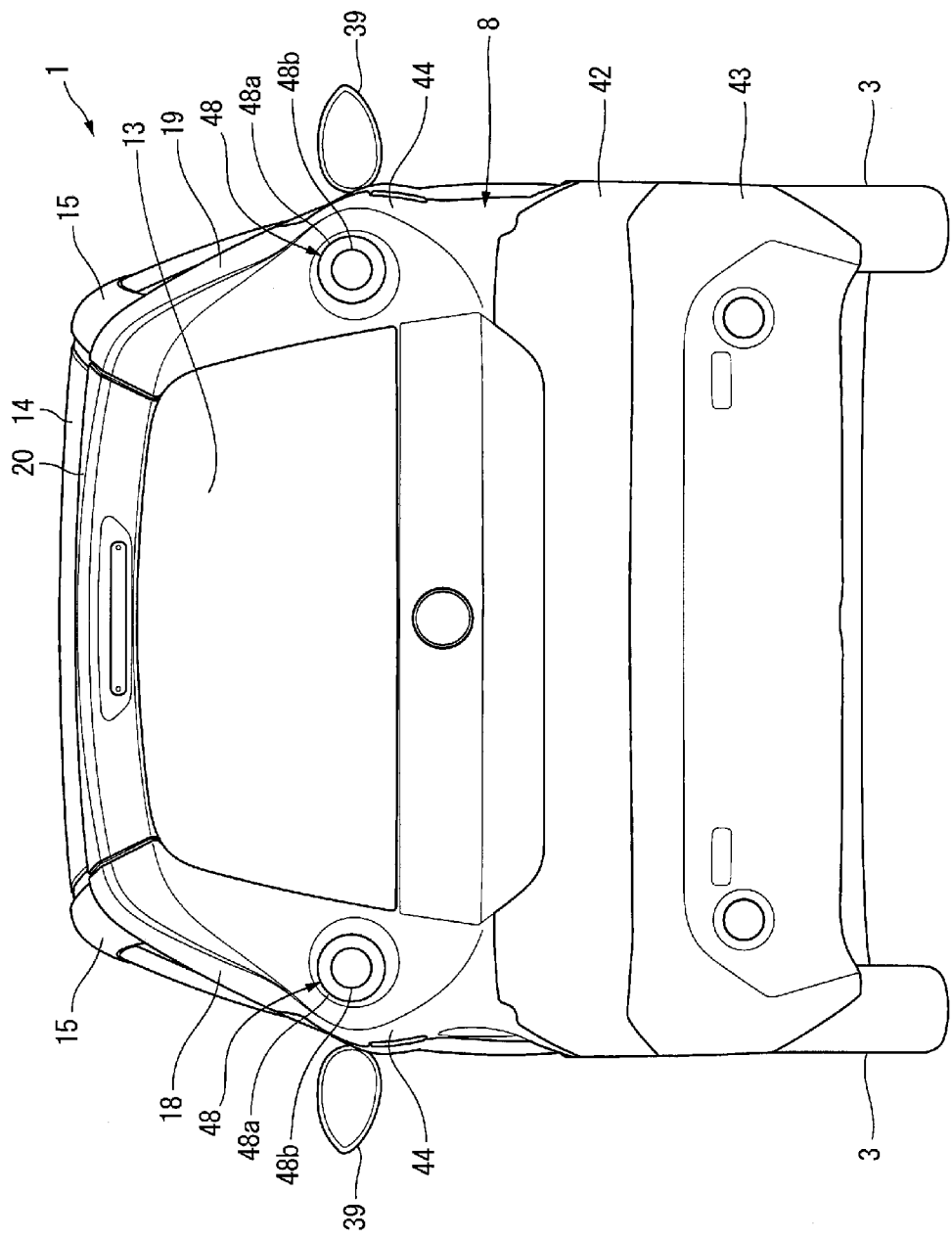
FIG. 3 is a rear view of the vehicle according to the first preferred embodiment of the present invention.

As shown in FIGS. 2 and 3, the front wheels 2 and rear wheels 3 are installed on the left and right sides of the vehicle body. The front wheels 2 are steered by using a steering wheel (not shown) installed in a vehicle interior 5 of the body 4. The rear wheels 3 rotate when they are driven by a driving apparatus (not shown) mounted in the rear portion of the chassis.

As shown in FIGS. 1 to 5, the body 4 includes an upper body 6 covering the upper portion of the vehicle interior 5, a front body 7 covering the front portion of the vehicle body, a rear body 8 covering the rear wheels 3, and a pair of left and right doors 9 and side sills 10 positioned between the front body 7 and rear body 8. Each door 9 opens when a passenger gets in and gets out. The door 9 horizontally swings around the end portion of the vehicle body front side, and opens outward in the vehicle widthwise direction from a closed position shown in FIG. 1.

Figure 4:
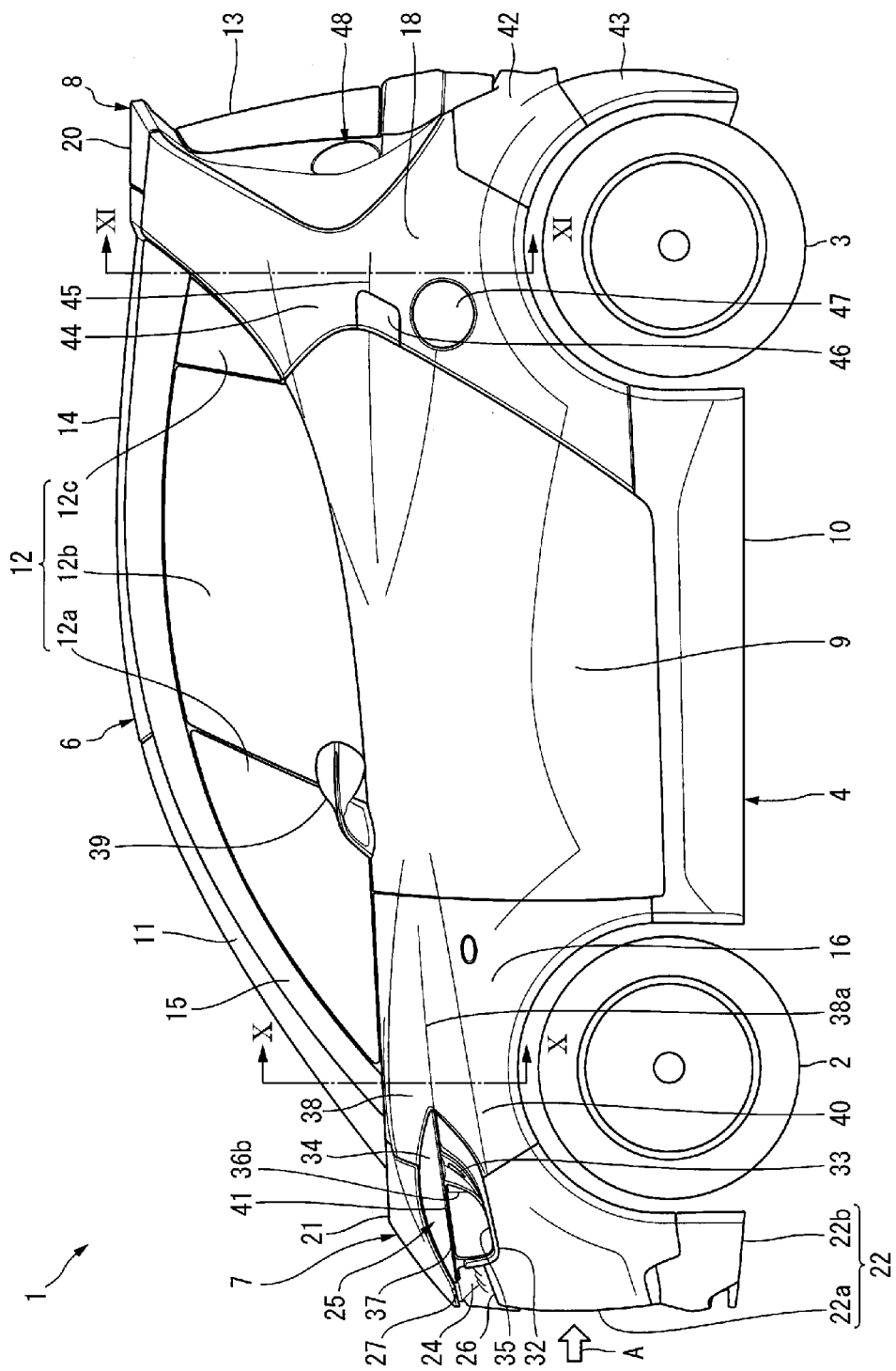
FIG. 4 is a side view of the vehicle according to the first preferred embodiment of the present invention.
Figure 5:
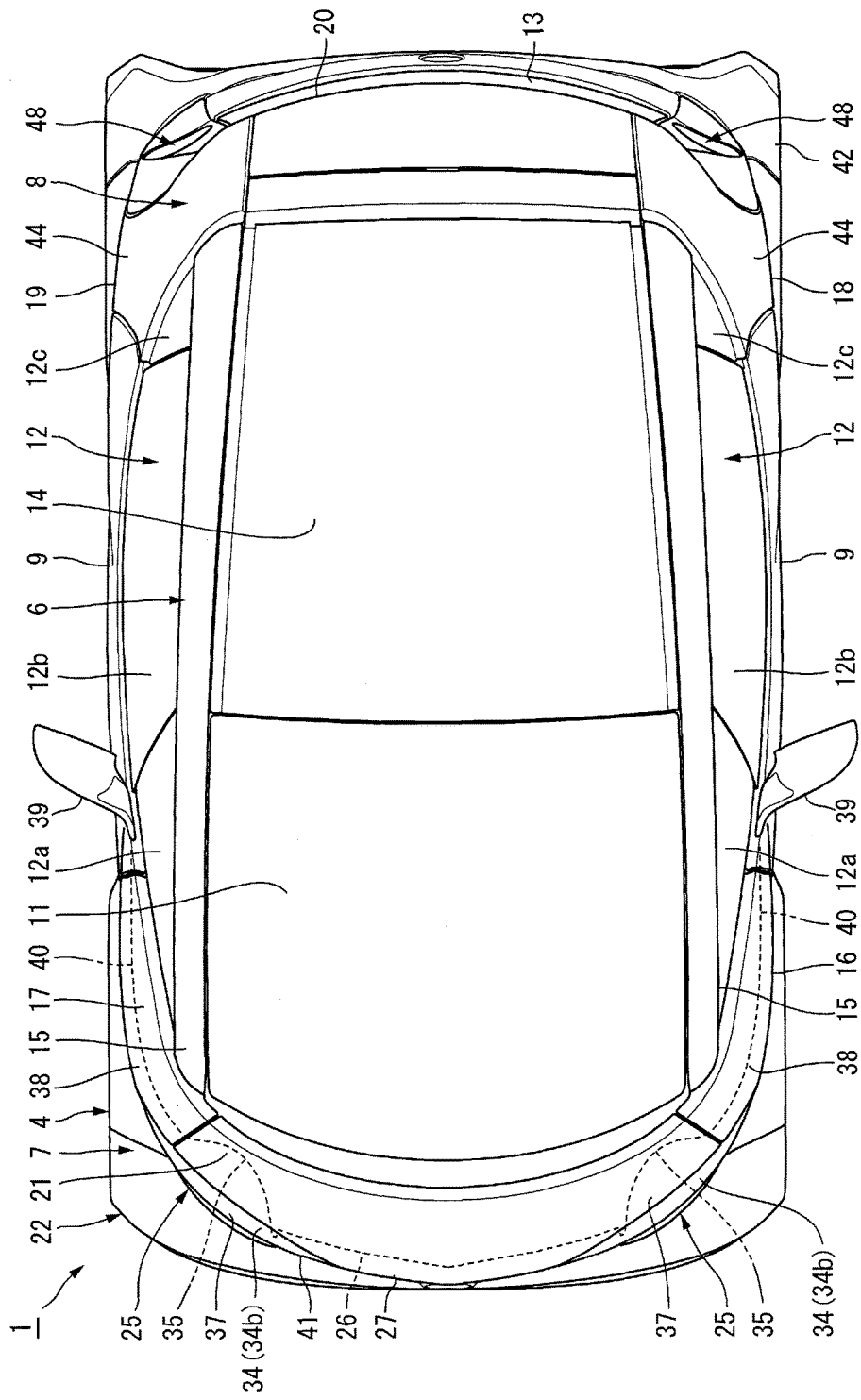
FIG. 5 is a plan view of the vehicle according to the first preferred embodiment of the present invention.

The upper body 6 includes a windshield 11, a pair of left and right side windows 12, a rear windshield 13 (see FIG. 3), a top plate 14, and a pair of left and right pillar portions 15. The windshield 11 covers the front portion of the vehicle interior 5. The windshield 11 extends from one end portion to the other of the vehicle 1 in the vehicle widthwise direction, and extends forward and downward from the front end of the top plate 14. The side windows 12 cover the side portions of the vehicle interior 5. As shown in FIGS. 4 and 5, each side window 12 according to this preferred embodiment is divided into three portions in the front-rear direction of the vehicle 1. That is, the side window 12 includes a front side window 12a positioned foremost, a main side window 12b, and a rear side window 12c. The front side windows 12a are positioned on the two sides of the windshield 11.

The rear windshield 13 covers the rear portion of the vehicle interior 5. The top plate 14 covers the upper portion of the vehicle interior 5. The pair of left and right pillar portions 15 extending in the front-rear direction of the vehicle body are connected to the two end portions of the top plate 14 in the vehicle widthwise direction. The front portions of the pillar portions 15 are positioned between the windshield 11 and front side windows 12a, and extend to incline forward and downward from positions adjacent to the top plate 14. The lower ends (front ends) of the pillar portions 15 are connected to front fender portions 16 and 17 of the front body 7 (to be described later). The rear end portions of the pillar portions 15 are connected to rear fender portions 18 and 19 of the rear body 8 (to be described later).

The rear end portion of the top plate 14 is connected to an upper cross member 20 of the rear body 8 (to be described later).

The front body 7 includes four functional elements. The four functional elements include a hood portion 21, a front bumper portion 22, the front fender portion 16 on the vehicle body left side, and the front fender portion 17 on the vehicle body right side. The front body 7 according to this preferred embodiment is provided preferably by combining the front bumper portion 22 and the pair of left and right front fender portions 16 and 17 with the hood portion 21.

The hood portion 21 extends forward and downward from the front end of the windshield 11. The hood portion 21 according to this preferred embodiment is defined by a plate material molded into a predetermined shape. Also, as shown in FIG. 5, the hood portion 21 preferably has an arc shape which projects toward the front of the vehicle body when viewed from above.

Figure 6:
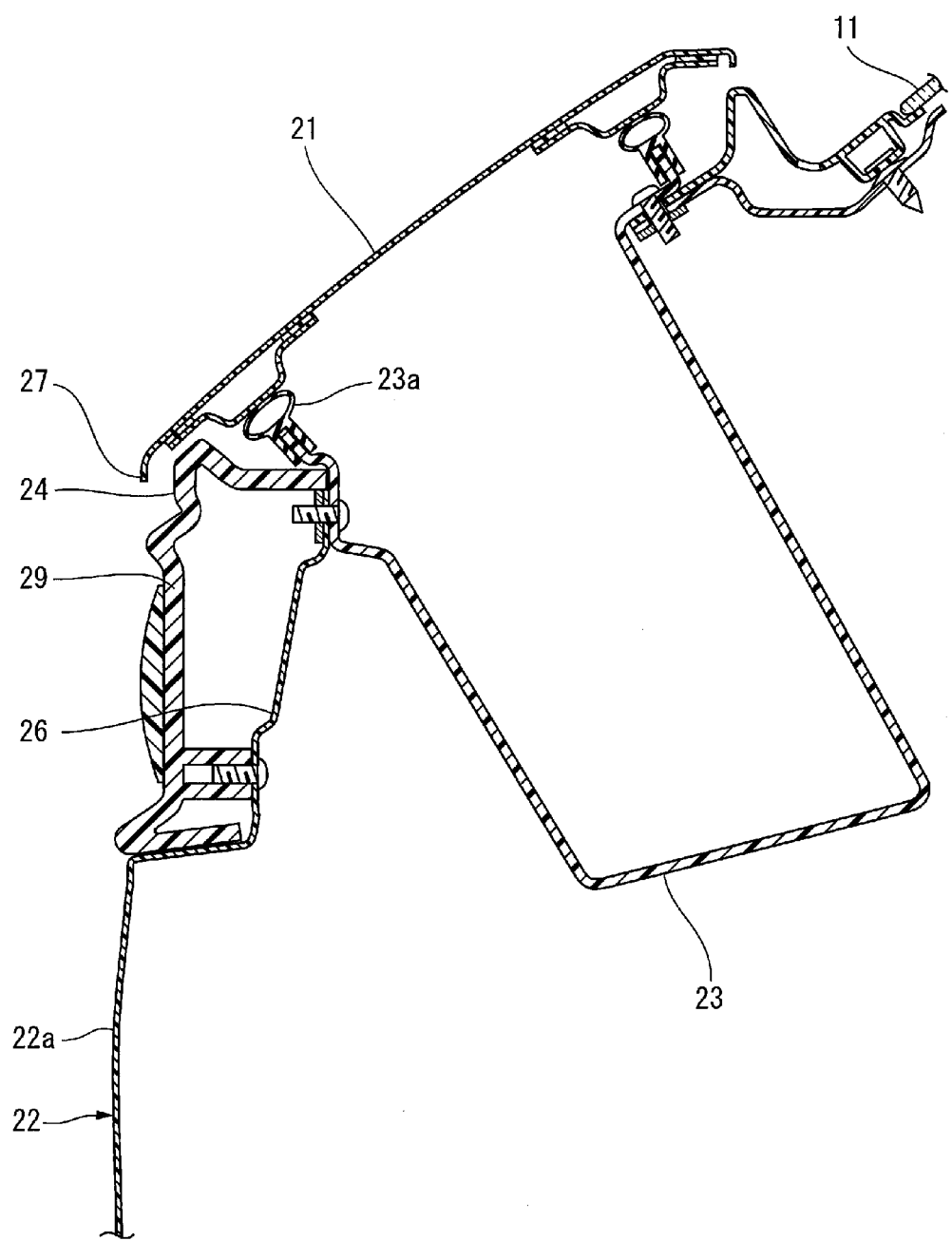
FIG. 6 is a sectional view of main portions taken along a line VI-VI in FIG. 2.
Figure 7:
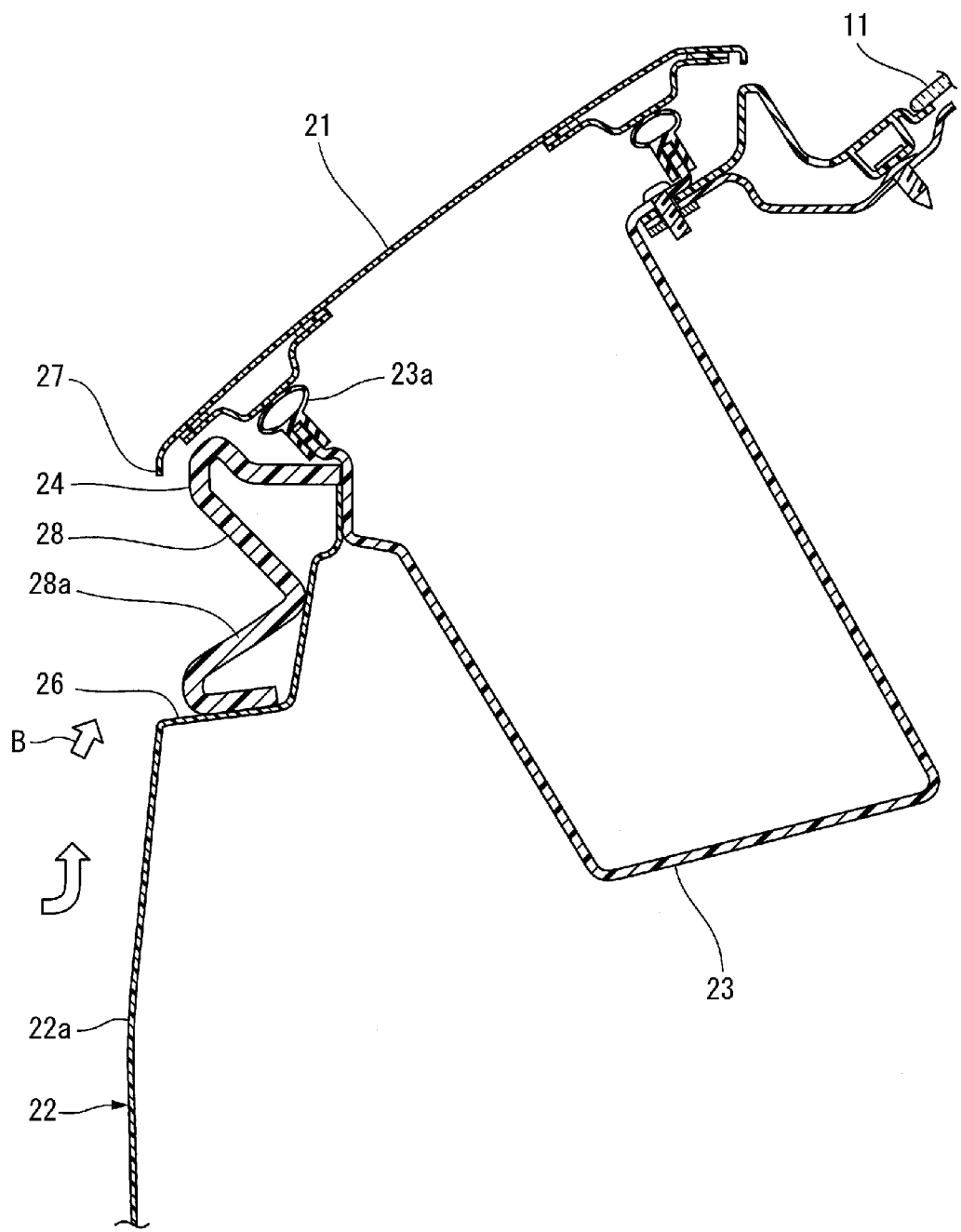
FIG. 7 is a sectional view of main portions taken along a line VII-VII in FIG. 2.

As shown in FIGS. 6 and 7, the hood portion 21 according to this preferred embodiment also defines and functions as a cover which closes the opening of a storage box 23 accommodated in the front body 7. The storage box 23 is used to store tools and other articles. A sealing member 23a is inserted between the hood portion 21 and storage box 23.

As shown in FIGS. 1 and 2, the front bumper portion 22 is positioned below the hood portion 21 when viewed from the front of the vehicle body, and covers the front end portions of the front wheels 2 from the front of the vehicle body. The front bumper portion 22 according to this preferred embodiment includes a bumper main body 22a connected to the hood portion 21 and front fender portions 16 and 17, and a front spoiler 22b attached to the lower end portion of the bumper main body 22a.

As shown in FIG. 4, the bumper main body 22a extends downward from the vicinity of the front end of the hood portion 21. As shown in FIG. 2, the front spoiler 22b is arranged between the bumper main body 22a and a road surface R.

A front grill 24 and a pair of left and right light units 25 are installed in the boundary portion between the front bumper portion 22 and hood portion 21.

As shown in FIGS. 6 and 7, the front grill 24 is inserted into a first recess portion 26 located in the boundary portion between the hood portion 21 and front bumper portion 22.

The first recess portion 26 preferably has a shape which opens toward the front of the vehicle body and extends in the vehicle widthwise direction. As shown in FIG. 2, the first recess portion 26 according to this preferred embodiment extends along the front end portion of the hood portion 21 to the opposite side in the vehicle widthwise direction, from the vicinity of the inner end of the light unit 25 positioned on the vehicle body left side to the vicinity of the inner end of the light unit 25 positioned on the vehicle body right side.

When the front grill 24 is detached from the first recess portion 26, the bottom positioned in the deepest portion of the first recess portion 26 preferably has a shape which is gradually positioned toward the vehicle body rear side as the bottom goes from the center to the both end portions along the vehicle widthwise direction. The planar shape of the first recess portion 26 can be an arc shape extending along the front end portion of the hood portion 21, or a mountain shape whose summit is the center in the vehicle widthwise direction.

As shown in FIGS. 6 and 7, the upper edge of the first recess portion 26 includes a first overhang portion 27 projecting toward the front of the vehicle body in the boundary portion between the hood portion 21 and front bumper portion 22. The first overhang portion 27 according to this preferred embodiment includes the front end portion of the hood portion 21. Note that the first overhang portion 27 is able to be defined by the hood portion 21 as described above, and also is able to be defined by the upper end portion of the front bumper portion 22 or the upper end portion of the front grill 24.

Figure 8:
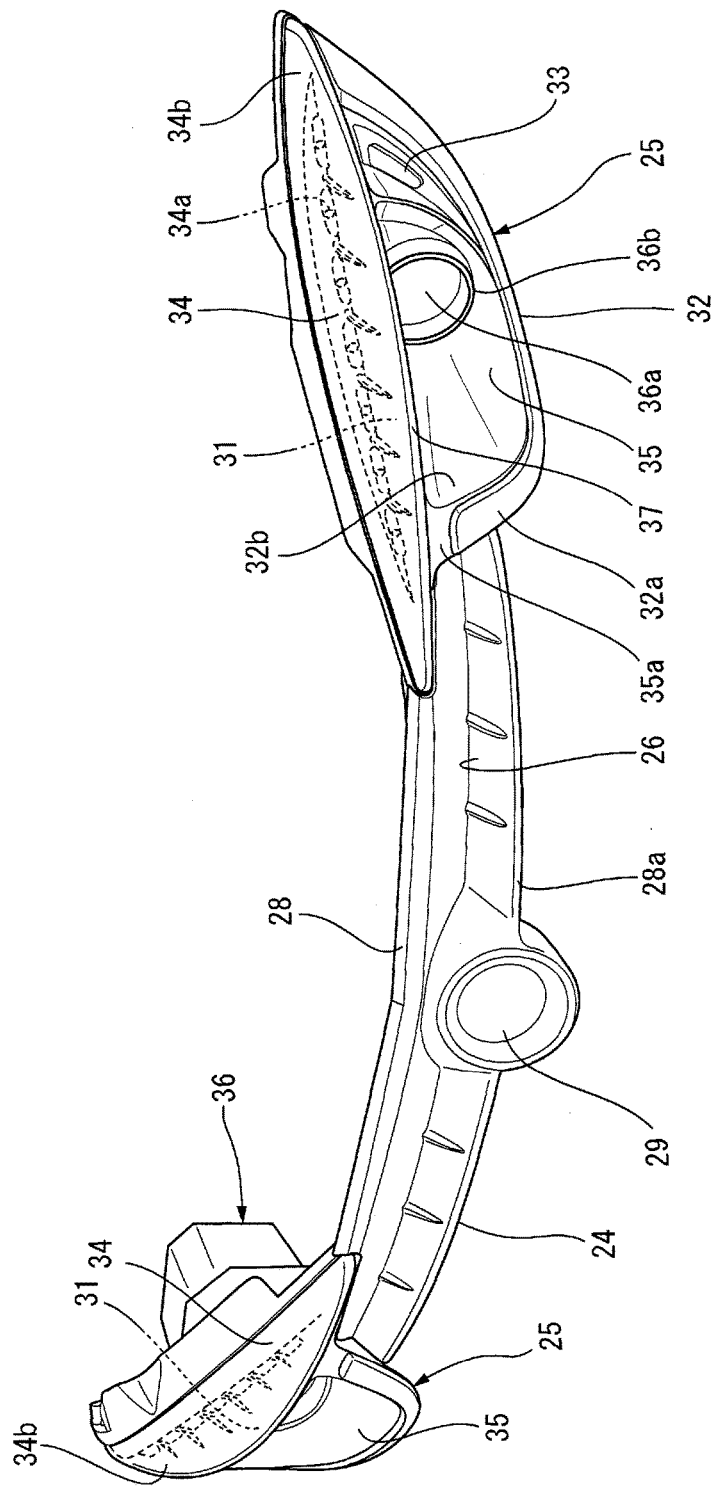
FIG. 8 is a perspective view of an assembly including a front grill and head lamp portions according to the first preferred embodiment of the present invention.

As shown in FIG. 8, the front grill 24 includes a plate-shaped portion 28 extending in the vehicle widthwise direction (in the horizontal direction in FIG. 8), and an emblem 29 positioned in the center of the plate-shaped portion 28. The planar shape of the plate-shaped portion 28 copies the planar shape of the bottom of the first recess portion 26. That is, the front grill 24 preferably has a shape which is gradually positioned toward the vehicle body rear side in directions from the center to the both end portions along the vehicle widthwise direction. The front grill 24 according to this preferred embodiment preferably has an arc shape which projects toward the front of the vehicle body when viewed from above.

As shown in FIG. 7, the plate-shaped portion 28 of the front grill 24 is inserted into the deepest portion of the first recess portion 26. Therefore, the bottom positioned in the deepest portion of the first recess portion 26 according to this preferred embodiment is practically defined by the plate-shaped portion 28 of the front grill 24. The plate-shaped portion 28 according to this preferred embodiment includes a baffle plate 28a including a V-shaped section which opens toward the front of the vehicle body. In addition, the light unit 25 on the vehicle body left side and the light unit 25 on the vehicle body right side are attached to the two ends of the plate-shaped portion 28.

The emblem 29 preferably has a circular shape when viewed from the front of the vehicle body, and positioned in the center of the front grill 24 in the vehicle widthwise direction. The front end of the emblem 29 projects toward the front of the vehicle body beyond the plate-shaped portion 28.

As shown in FIGS. 1 and 2, the light units 25 are positioned in the two end portions of the front body 7 in the vehicle widthwise direction. As shown in FIG. 5, the light units 25 are installed as they are inclined in the horizontal direction. The inclination direction is a direction in which each light unit 25 is gradually positioned toward the vehicle body rear side in a direction to the outside along the vehicle widthwise direction.

As shown in FIG. 8, a projecting wall 31 extending in the vehicle widthwise direction is located in the front portion of each light unit 25 according to this preferred embodiment. The projecting wall 31 preferably has an overhang shape which projects toward the front of the vehicle body. A headlight portion 32 and turn signal lamp portion 33 are integrally provided below the projecting wall 31. A position lamp portion 34 is integrally provided above the projecting wall 31. The projecting wall 31 practically defines and functions as a support plate of the position lamp portion 34.

Figure 9:
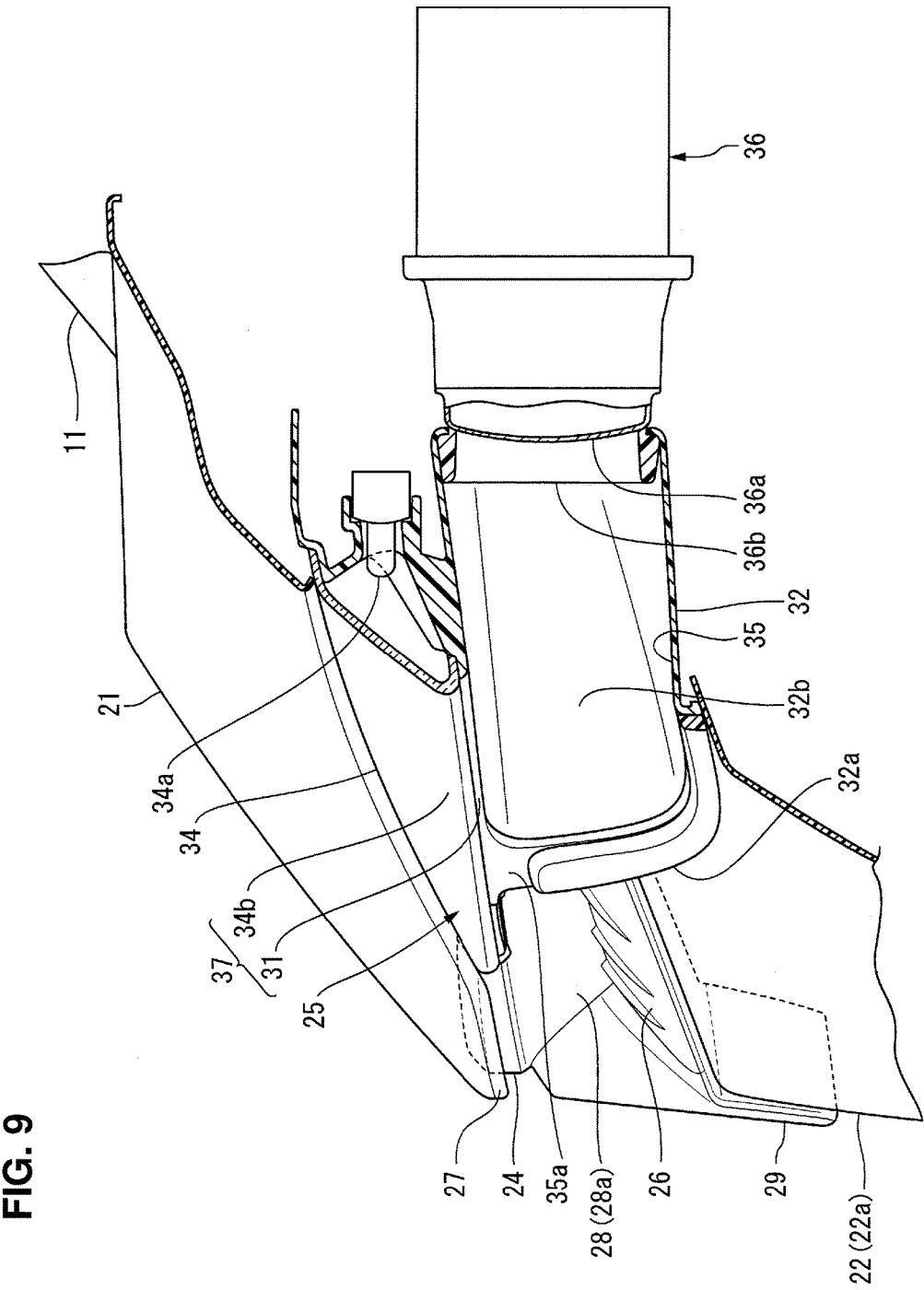
FIG. 9 is a sectional view of main portions taken along a line IX-IX in FIG. 2.

As shown in FIG. 9, the headlight portion 32 includes a second recess portion 35 having a shape which opens toward to the front of the vehicle body, and a projector headlight 36 installed in the deepest portion of the second recess portion 35. The upper edge of the second recess portion 35 is connected to the above-described projecting wall 31.

The headlight portion 32 of the light unit 25 on the vehicle body left side and the headlight portion 32 of the light unit 25 on the vehicle body right side are connected via the front grill 24.

In the deepest portion of the second recess portion 35, a lens cover 36a covering a convex lens (not shown) of the projector headlight 36 and a ring-shaped cover 36b are exposed. The turn signal lamp portion 33 is located outside beyond the lens cover 36a in the vehicle widthwise direction. The ring-shaped cover 36b preferably has a cylindrical shape, and performs the following two functions. The first function is a function as an emission port of the projector headlight 36. The second function is a function of sealing a portion between the deepest portion of the second recess portion 35 and the lens cover 36a.

The position lamp portion 34 includes a plurality of LEDs 34a arranged in the vehicle widthwise direction, and a lamp cover 34b which is made of a transparent material and covers the LEDs 34a. The lamp cover 34b preferably has a shape extending along the above-described projecting wall 31 in the vehicle widthwise direction. That is, the lamp cover 34b preferably has an overhang shape projecting toward the front of the vehicle body together with the projecting wall 31. The projecting wall 31 and lamp cover 34b define a second overhang portion 37 connected to the above-described first overhang portion 27.

As shown in FIG. 5, the planar shape of the front end of the lamp cover 34b preferably has an arc shape when viewed from above. This arc defining the front end of the lamp cover 34b is gently connected to the arc defining the front end (the first overhang portion 27) of the hood portion 21 without forming any step or corner.

The first and second overhang portions 27 and 37 project toward the front of the vehicle body. In this preferred embodiment, the first and second overhang portions 27 and 37 are gently connected as described above. As shown in FIG. 9, therefore, the first and second overhang portions 27 and 37 cover the upper portion of the assembly including the front grill 24 and the pair of left and right headlight portions 32.

Accordingly, the first and second recess portions 26 and 35 described above spatially continue to each other via a so-called space under the overhang located below the first and second overhang portions 27 and 37.

In this preferred embodiment, to increase the continuation of the first and second recess portions 26 and 35, a communication groove 35a (see FIG. 9) is provided on the inside of the second recess portion 35 in the vehicle widthwise direction. The communication groove 35a according to this preferred embodiment is located between a belt-shaped member 32a (see FIGS. 8 and 9) attached to the front surface of the headlight portion 31 and the lamp cover 34b of the position lamp portion 34 (to be described below). Note that the communication groove 35a is not essential.

Figure 10:
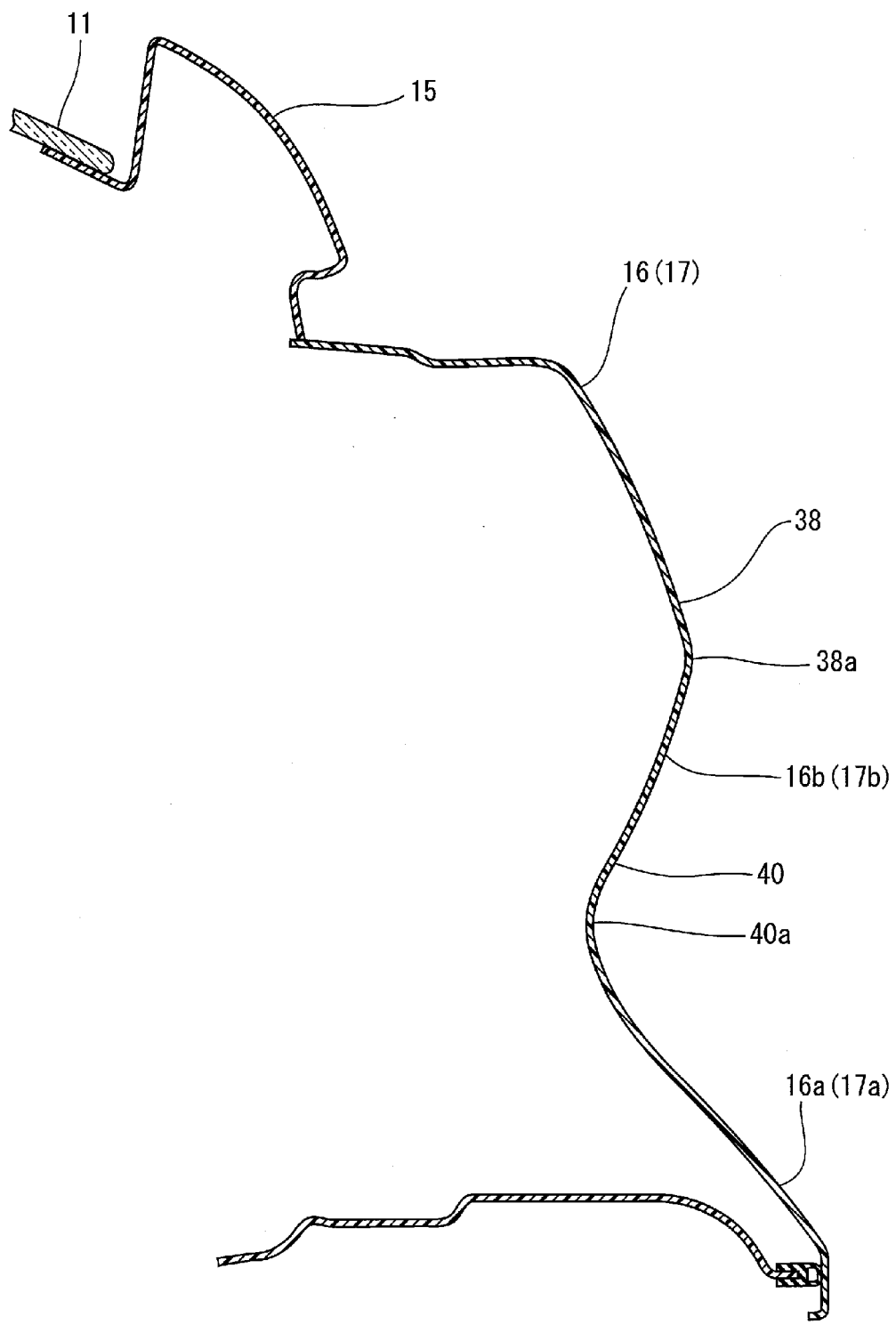
FIG. 10 is a sectional view of a front fender portion taken along a line X-X in FIG. 4.

The front fender portions 16 and 17 cover the front wheels 2 in cooperation with the front bumper portion 22, and are connected to the end portions of the hood portion 21 and front bumper portion 22 in the vehicle widthwise direction. As shown FIGS. 1 and 2, a bulge portion 38 projecting toward the side of the vehicle body is located above each of the front fender portions 16 and 17. As shown in FIG. 10, the bulge portion 38 preferably a mountain sectional shape, and extends in the front-rear direction of the vehicle body from the front end portion of each of the front fender portions 16 and 17 to the front end portion of the door 9. A door mirror 39 is attached to the front end portion of the door 9. As shown in FIG. 4, the door mirror 39 is positioned closer to the vehicle body rear side than the lower end of the pillar portion 15.

The rear end portion of the bulge portion 38 extends to a portion below the door mirror 39 and near the front end of the door mirror 39. The height of the bulge portion 38 (the amount of projection toward the vehicle body side) gradually decreases toward the rear of the vehicle body.

The rear end portion of the light unit 25 is connected to the end portion of the bulge portion 38 on the vehicle body front side. The lamp cover 34b positioned in the upper end portion of the light unit 25 is connected to a summit 38a of the bulge portion 38.

As shown in FIG. 10, a third recess portion 40 is located between the bulge portion 38 and each of wheel housings 16a and 17a of the front fender portions 16 and 17, which house the front wheels 2. The third recess portion 40 preferably has a shape which opens toward the side of the vehicle body and extends in the front-rear direction of the vehicle body. As shown in FIGS. 1 and 4, the third recess portion 40 according to this preferred embodiment extends backward from the lower end of the above-described headlight portion 32 as a start point.

That is, the third recess portion 40 extends from the lower end of the headlight portion 32 toward the rear of the vehicle body through the portion between the bulge portion 38 and wheel housing portion 16a or 17a.

As shown in FIG. 10, a portion between a bottom 40a positioned in the deepest portion of the third recess portion 40 and the summit 38a of the bulge portion 38 in the front fender portions 16 or 17 is defined by an inclined surface 16b or 17b which is gradually positioned toward the outside of the vehicle body as the an inclined surface goes upwardly.

As shown in FIG. 2, the first, second, and third recess portions 26, 35, and 40 described above are aligned in the vehicle widthwise direction and extend in a row. As shown in FIG. 1, the upper edges of the first, second, and third recess portions 26, 35, and 40 define a ridge line 41. The ridge line 41 projects toward the outside of the vehicle body, and extends from the center in the vehicle widthwise direction toward the vehicle body rear side beyond the lower ends of the pillar portions 15 through the position lamp portions 34. That is, the ridge line 41 is defined by the first overhang portions 27 of the hood portion 21, the lamp covers 34b (the second overhang portions 37) of the position lamp portions 34, and the bulge portions 38 (the summits 38a) of the front fender portions 16 and 17. As shown in FIG. 4, the ridge line 41 according to this preferred embodiment extends toward the vehicle body rear side below the door mirrors 39.

As shown in FIGS. 1 and 3 to 5, the rear body 8 includes the pair of left and right rear fender portions 18 and 19 covering the front portions of the rear wheels 3, and a rear panel portion 42 and rear bumper portion 43 covering the rear wheels 3 in cooperation with the rear fender portions 18 and 19. The upper end portion of the rear fender portion 18 positioned on the vehicle body left side and the upper end portion of the rear fender portion 19 positioned on the vehicle body right side are connected to each other by the upper cross member 20.

Figure 11:
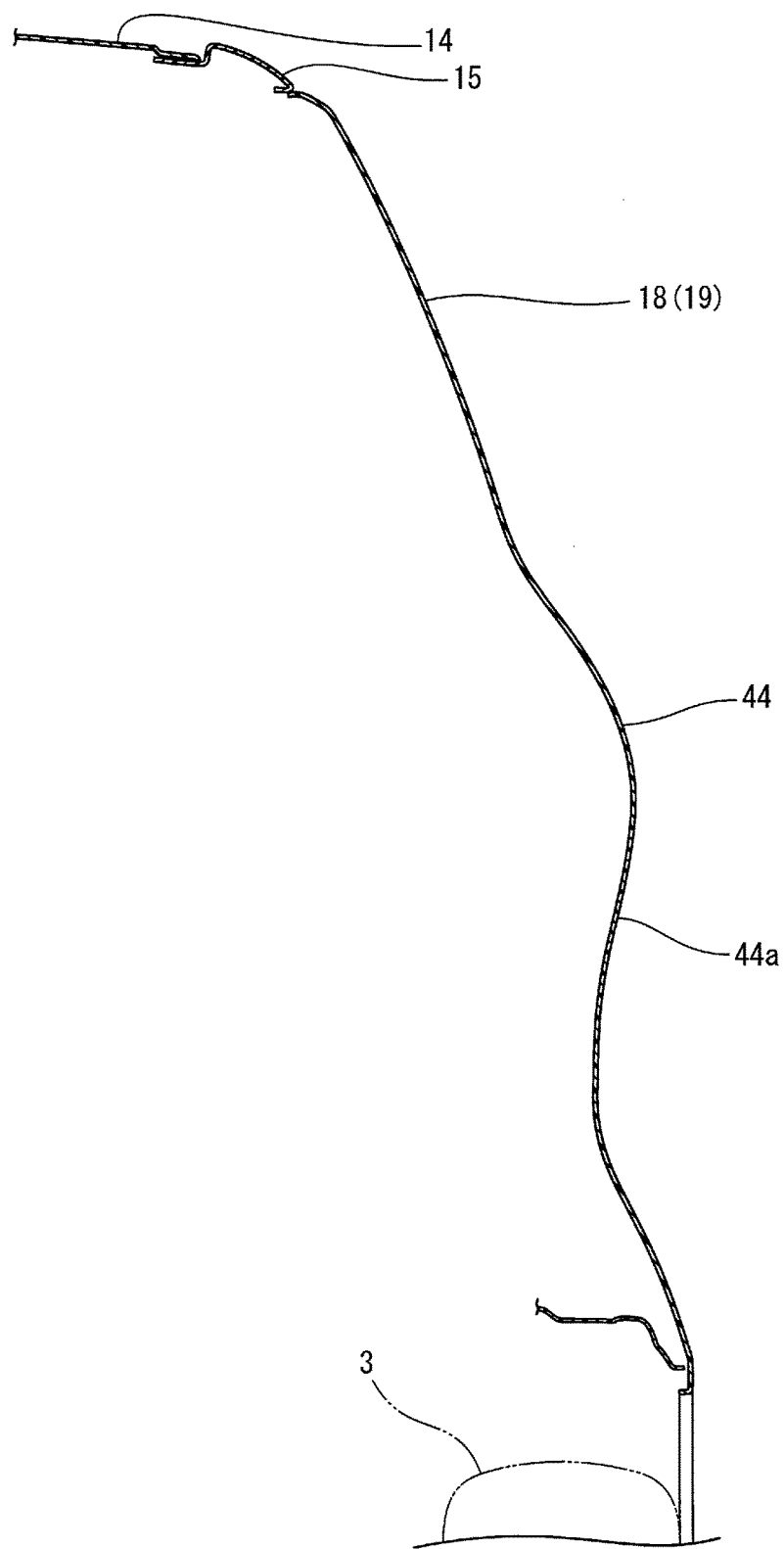
FIG. 11 is a sectional view of a rear fender portion taken along a line XI and XI in FIG. 4.

As shown in FIGS. 1 and 3, read-side bulge portions 44 projecting toward the sides of the vehicle body are located in the two end portions of the rear body 8 in the vehicle widthwise direction. As shown in FIG. 11, each rear-side bulge portion 44 preferably has a mountain sectional shape. Also, as shown in FIG. 4, the rear-side bulge portion 44 extends from the central portion of the door 9 in the front-rear direction as a start point, and extends toward the rear of the vehicle body from this start point. The rear-side bulge portion 44 preferably has a shape which gradually increases the amount of projection toward the side of the vehicle body and the width in the vertical direction, in a direction toward the vehicle body rear side. In addition, a ridge line 45 is provided on the summit of the rear-side bulge portion 44. The ridge line 45 is positioned on the extension of the ridge line 41 of the front body 7.

Doorknob lids 46 covering the knobs (not shown) of the doors 9 are provided in those portions of the rear fender portions 18 and 19, which correspond to the ridge lines 45. Also, in the rear fender portion 18 on the vehicle body left side, a driving apparatus lid 47 is located below the doorknob lid 46. When using an engine as the power source of a driving apparatus, a fuel supply portion is covered with the driving apparatus lid 47. When using an electric motor as the driving source of the driving apparatus, a charge socket insertion portion is covered with the driving apparatus lid 47.

As shown in FIG. 3, the rear-side bulge portions 44 are positioned at almost the same height as that of the lower end portion of the rear windshield 13. In other words, the lower end portion of the rear windshield 13 and the rear-side bulge portions 44 are aligned in the vehicle widthwise direction when viewed from the rear of the vehicle body. A rear light unit 48 is located between each rear-side bulge portion 44 and the rear windshield 13. The rear light unit 48 includes a brake lamp 48a and flasher lamp 48b. In this preferred embodiment, the lower end portion of the rear windshield 13, the rear light units 48, the rear-side bulge portions 44, and the door mirrors 39 are aligned in the vehicle widthwise direction when viewed from the vehicle body rear side.

When the vehicle 1 constructed as described above runs, the traveling wind blows against the front bumper portion 22 as indicated by an arrow A in FIG. 4. A portion of the traveling wind having blown against the front bumper portion 22 is guided upward along the front surface of the front bumper portion 22 as indicated by an arrow B in FIG. 7. The traveling wind thus flowing upward along the front bumper portion 22 blows against the first or second overhang portion 27 or 37, and is guided into the first and second recess portions 26 and 35.

The traveling wind guided into the first and second recess portions 26 and 35 flows in the recess portions 26 and 35 toward the side of the vehicle body, and flows to the vehicle body rear side beyond the lower end of the pillar portion 15 through the third recess portion 40.

During or after rain, a mist of muddy water splashed by vehicles such as a preceding car and oncoming car temporarily drifts near the road surface R after these vehicles have passed. If the vehicle 1 according to various preferred embodiments of the present invention enters the space in which this mist of muddy water is drifting, the mist of muddy water rides on the traveling wind and flows along the vehicle body surface.

Of this mist of muddy water, a portion of the mist of muddy water guided upward together with the traveling wind by the front bumper portion 22 changes its flowing direction by the first or second overhang portion 27 or 37 described above, and is guided together with the traveling wind into the first and second recess portions 26 and 35. This mist of muddy water flows into the third recess portion 40 through the second recess portion 35, and is discharged to the vehicle body rear side beyond the lower end of the pillar portion 15 through the third recess portion 40.

That is, this mist of muddy water flows backward without adhering to the windshield 11 and the side windows 12.

Accordingly, this preferred embodiment provides a vehicle capable of significantly reducing or preventing a mist of muddy water which rides on the traveling wind from adhering to the windshield 11 and the side windows 12.

The bottom positioned in the deepest portion of the first recess portion 26 according to this preferred embodiment is defined by the front grill 24 inserted into the first recess portion 26.

The front grill 24 connects the headlight portion 32 on the vehicle body left side and the headlight portion 32 on the vehicle body right side.

In this preferred embodiment, therefore, the traveling wind guided to the first recess portion 26 flows along the front grill 24, and smoothly flows from the first recess portion 26 into the second recess portion 35 in the headlight portion 32.

Accordingly, it is possible to prevent the mist of muddy water guided into the first recess portion 26 from coming out upward from the first recess portion 26, so the windshield 11 is prevented from being dirtied.

As shown in FIG. 8, the second recess portion 35 according to this preferred embodiment extends to the first recess portion 26 with an inner sidewall 32b of the headlight portion 32 being sandwiched between them. Therefore, the mist of muddy water having flowed in the first recess portion 26 toward the outside in the vehicle widthwise direction together with the traveling wind separates from the traveling wind when blowing against the sidewall 32b, and flows downward along the sidewall 32b. That is, since the amount of mist of muddy water guided toward the second recess portion 35 decreases, the windshield 11 and the side windows 12 are prevented from becoming dirty.

The bottom positioned in the deepest portion of the first recess portion 26 according to this preferred embodiment preferably has a shape which is gradually positioned toward the vehicle body rear side as the bottom extends from the center to the both end portions along the vehicle widthwise direction.

Accordingly, the traveling wind and the mist of muddy water having flowed into the first recess portion 26 readily flow to the two sides in the vehicle widthwise direction along the first recess portion 26. In this preferred embodiment, therefore, it is possible to more reliably guide the mist of muddy water to the rear of the vehicle body.

The third recess portion 40 according to this preferred embodiment extends from the lower end of the headlight portion 32 as a start point to the rear of the vehicle body through the portion between the bulge portion 38 of the front fender portion 16 or 17 and the wheel housing portion 16a or 17a to house the front wheel 2.

Accordingly, the traveling wind and the mist of muddy water flow along the lower wall surface of the second recess portion 35 and flow into the third recess portion 40. That is, the traveling wind and the mist of muddy water flow from the second recess portion 35 to the third recess portion 40 without being interrupted.

In this preferred embodiment, therefore, the mist of muddy water is effectively discharged toward the rear of the vehicle body.

In this preferred embodiment, the portion between the bottom positioned in the deepest portion of the third recess portion 40 and the ridge line 41 is defined by the inclined surface 16b or 17b which is gradually positioned toward the outside of the vehicle body as the portion goes upwardly.

Accordingly, the traveling wind and the mist of muddy water flow toward the rear of the vehicle body along the inclined surface 16b or 17b without being interrupted. Therefore, this preferred embodiment provides a vehicle capable of reliably discharging the mist of muddy water backward.

The vehicle 1 according to this preferred embodiment includes the door mirrors 39 positioned closer to the vehicle body rear side than the lower ends of the pillar portions 15. Also, the ridge line 41 extends to the vehicle body rear side directing below the door mirrors 39.

In this preferred embodiment, therefore, the mist of muddy water is discharged backward below the door mirrors 39 together with the traveling wind. Accordingly, it is possible to provide a vehicle capable of preventing muddy water splashed by a preceding car or oncoming car from adhering to the door mirrors 39.

The vehicle 1 according to this preferred embodiment includes the rear body 8 including the rear fender portions 18 and 19 covering the rear wheels 3, and the rear windshield 13 provided in the rear body 8 and covering the rear portion of the vehicle interior 5. In the two end portions of the rear body 8 in the vehicle widthwise direction, the rear-side bulge portions 44 having the ridge lines 45 positioned on the extensions of the ridge line 41 described above and projecting toward the sides of the vehicle body are provided. The lower end portion of the rear windshield 13 and the rear-side bulge portions 44 are aligned in the vehicle widthwise direction when viewed from the rear of the vehicle body.

In this preferred embodiment, the traveling wind and the mist of muddy water having passed through the third recess portion 40 and flowed to the vehicle body rear side along the side surface of the vehicle body flow to the rear side along an inclined surface 44a (see FIG. 11) below the rear-side bulge portion 44. That is, the direction in which the traveling wind and the mist of muddy water flow is regulated by the rear-side bulge portion 44, i.e., is limited to the portion below the rear-side bulge portion 44.

Accordingly, even when the door mirror 39 moves fast against the wind and generates a turbulence behind it, the mist of muddy water flowing backward along the door 9 is hardly blown up.

In this preferred embodiment, therefore, even when the mist of muddy water having passed through the third recess portions 40 and flowed backward goes around to the rear surface of the vehicle body, this mist of muddy water hardly adheres to the rear windshield 13. As a consequence, this preferred embodiment provides a vehicle in which the rear windshield 13 is prevented from becoming dirty.

Second Preferred Embodiment

Figure 12:
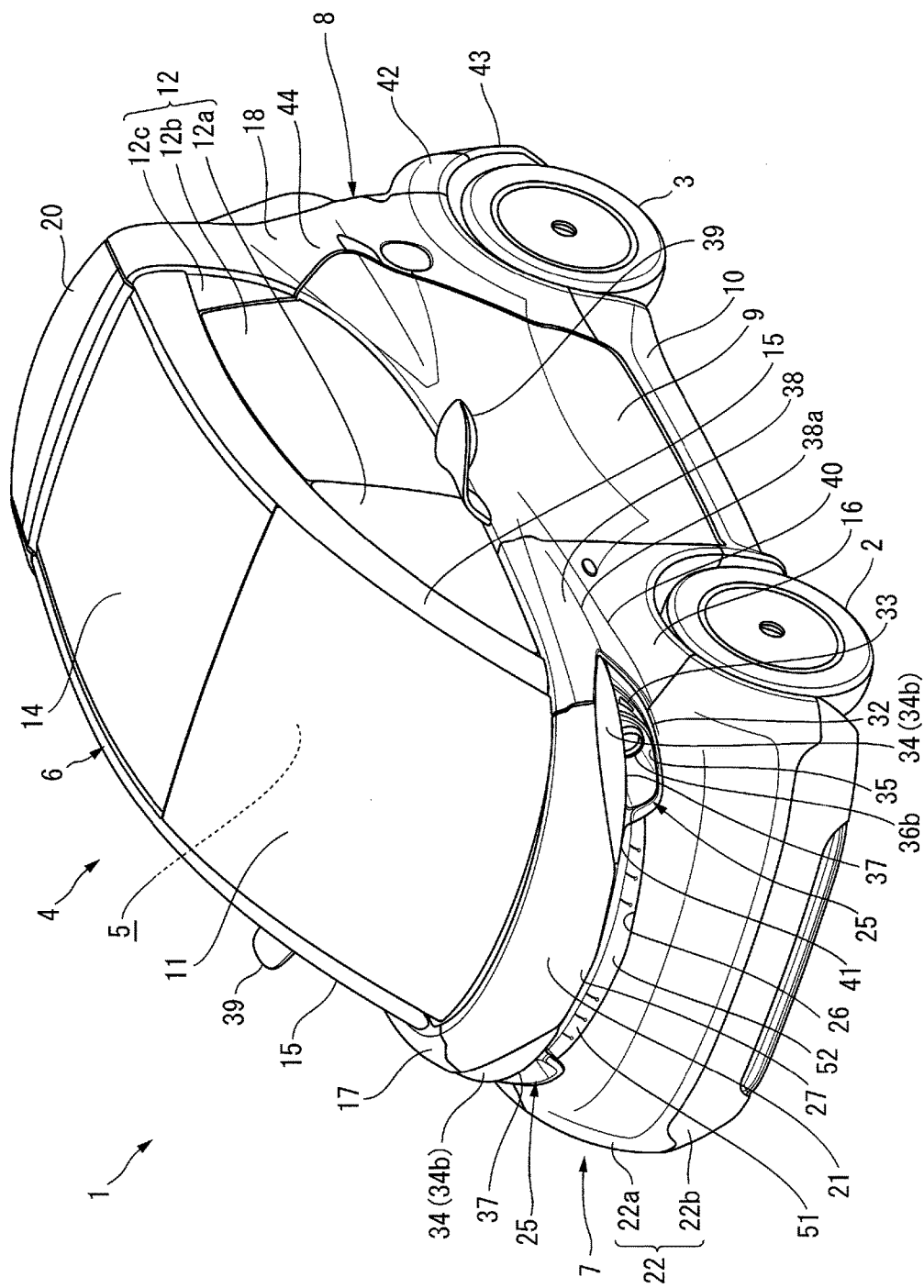
FIG. 12 is a perspective view of a vehicle according to a second preferred embodiment of the present invention.

The front grill can also be structured as shown in FIG. 12. The same or almost the same members as explained with reference to FIGS. 1 to 11 are denoted by the same reference numerals in FIG. 12, and a detailed explanation thereof will appropriately be omitted.

A front grill 51 shown in FIG. 12 is defined by only a plate-shaped portion 52 extending in the vehicle widthwise direction. That is, there is no emblem 29 explained in the first preferred embodiment. The only difference of the front grill 51 according to this preferred embodiment from the front grill 24 explained in the first preferred embodiment is the presence/absence of the emblem 29.

When using the front grill 51 according to this preferred embodiment, a practical aperture area of a first recess portion 26 increases by the area of the emblem 29. In this preferred embodiment, therefore, traveling wind and the mist of muddy water having flowed upward over a front bumper portion 22 can be guided to the sides of the vehicle body more reliably.

The turn signal lamp portion 33 according to the first and second preferred embodiments described above is installed in the position adjacent to the headlight portion 32 in the vehicle widthwise direction. However, the turn signal lamp portion 33 is also able to be installed in the position of the position lamp portion 34 explained in the first and second preferred embodiments. In this case, the position lamp portion 34 is installed in a position outside and adjacent to the headlight portion 32 in the vehicle widthwise direction. Also, a lamp cover of the turn signal lamp portion 33 in this case preferably has a shape having a front-end edge which defines a portion of the ridge line 41.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   a windshield covering a front portion of a vehicle interior;
   side windows covering side portions of the vehicle interior;
   a hood extending obliquely forward and downward from a front end of the windshield;
   a front bumper positioned below the hood when viewed from a front of a vehicle body;
   front fenders connected to both ends of each of the hood and the front bumper in a vehicle widthwise direction;
   headlights positioned in both ends of a front body in the vehicle widthwise direction, the front body being defined by a combination of the front bumper, the front fenders and the hood;
   turn signal lamps or position lamps positioned above the headlights; and
   pillars vertically extending between the windshield and the side windows; wherein
   a first recess having a shape which opens toward the front of the vehicle body and extends in the vehicle widthwise direction is located in a boundary area between the hood and the front bumper;
   a second recess having a shape which opens toward the front of the vehicle body is located in each of the headlights;
   a third recess which opens toward a side of the vehicle body and extends in a front-rear direction of the vehicle body is located in each of the front fenders;
   the first recess, the second recesses, and the third recesses are aligned in the vehicle widthwise direction and extend in a row;
   upper edges of the first recess, the second recesses and the third recesses define a ridge line which projects toward an outside of the vehicle body and extend from a center in the vehicle widthwise direction to a vehicle body rear side beyond lower ends of the pillars through the turn signal lamps or the position lamps; and
   the ridge line includes:
   a first overhang which projects toward the front of the vehicle body in a boundary area between the hood and the front bumper;
   a second overhang which projects toward the front of the vehicle body in each of the turn signal lamps or the position lamps; and
   a bulge of each of the front fenders, which projects toward the side of the vehicle body.

2. The vehicle according to claim 1, wherein
   a bottom positioned in a deepest portion of the first recess is defined by a front grill inserted into the first recess; and
   the front grill connects the headlight on a vehicle body left side and the headlight on a vehicle body right side.

3. The vehicle according to claim 1, wherein a bottom positioned in a deepest portion of the first recess has a shape which is gradually positioned toward the vehicle body rear side as the bottom goes from a center to both ends along the vehicle widthwise direction.

4. The vehicle according to claim 1, wherein each of the third recesses extend from a lower end of each of the headlights as a start point to the rear of the vehicle body through an area located between the bulges of the front fenders and wheel housings each housing a front wheel.

5. The vehicle according to claim 4, wherein an area between a bottom positioned in a deepest portion of each of the third recesses and the ridge line is defined by an inclined surface which is gradually positioned toward the outside of the vehicle body as the inclined surface extends upwardly.

6. The vehicle according to claim 1, further comprising door mirrors positioned closer to a vehicle body rear side than the lower ends of the pillars, wherein the ridge line extends to the vehicle body rear side below the door mirrors.

7. The vehicle according to claim 1, further comprising:
   a rear body including rear fenders covering rear wheels; and
   a rear windshield in the rear body and covering a rear portion of the vehicle interior; wherein
   a rear-side bulge which has a ridge line positioned on an extension of the ridge line and projects toward the side of the vehicle body is located in each of two ends of the rear body in the vehicle widthwise direction; and
   a lower end of the rear windshield and the rear-side bulges are aligned in the vehicle widthwise direction when viewed from the rear of the vehicle body.

* * * * *

UNITED STATES PATENT AND TRADEMARK OFFICE
CERTIFICATE OF CORRECTION

PATENT NO. : 9,821,861 B2
APPLICATION NO. : 15/035770
DATED : November 21, 2017
INVENTOR(S) : Ian Murray et al.

Page 1 of 1

It is certified that error appears in the above-identified patent and that said Letters Patent is hereby corrected as shown below:

On the Title Page

The first inventor listed in item (72) should read as follows:
--Ian Murray, Surrey (GB)--

The fourth inventor listed in item (72) should read as follows:
--Mark Jones, Surrey (GB)--

Signed and Sealed this
Fifteenth Day of May, 2018

Andrei Iancu
*Director of the United States Patent and Trademark Office*